United States Patent [19]

Marriott

[11] Patent Number: 5,120,926
[45] Date of Patent: Jun. 9, 1992

[54] METHOD AND APPARATUS FOR HIGH SPEED LASER CUTTING

[75] Inventor: David A. Marriott, Keego Harbor, Mich.

[73] Assignee: General Motors Corporation, Detroit, Mich.

[21] Appl. No.: 617,836

[22] Filed: Nov. 26, 1990

[51] Int. Cl.$^5$ .................. B23K 26/14; B23K 26/16
[52] U.S. Cl. ................... 219/121.67; 219/121.72; 219/121.75; 219/121.84
[58] Field of Search ............... 219/121.67, 121.72, 219/121.84, 121.73, 121.75

[56] References Cited

U.S. PATENT DOCUMENTS

| | | | |
|---|---|---|---|
| 3,604,890 | 9/1971 | Mullaney et al. | 219/121.6 |
| 4,273,398 | 6/1981 | Summers et al. | 219/121.67 X |
| 4,461,947 | 7/1984 | Ward | 219/121.84 |
| 4,692,583 | 9/1987 | Kimmura et al. | 219/121.6 |
| 4,871,897 | 10/1989 | Nielsen | 219/121.67 |
| 4,885,448 | 12/1989 | Kasner et al. | 219/121.65 |

FOREIGN PATENT DOCUMENTS

| | | | |
|---|---|---|---|
| 0093095 | 4/1987 | Japan | 219/121.75 |
| 0020681 | 1/1990 | Japan | 219/121.75 |

Primary Examiner—C. L. Albritton

[57] ABSTRACT

A laser cutting device has a slot-like nozzle opening and an elongated laser beam pattern projecting through the nozzle opening along with a stream of gas to interact with a workpiece for rapid melting and material removal from the cut. By elongating the beam pattern in the cutting direction and maintaining the same energy density, the cutting speed can be increased without diminishing the interaction time with each point of the cut path. The nozzle is rotatable to align the nozzle opening with the cutting path.

8 Claims, 2 Drawing Sheets

METHOD AND APPARATUS FOR HIGH SPEED LASER CUTTING

FIELD OF THE INVENTION

This invention relates to a method and apparatus for laser cutting and particularly for high speed cutting.

BACKGROUND OF THE INVENTION

It is well known to cut either metals or nonmetals by a laser beam focused on the surface of the material and moved along the surface to melt away the material in the path of the laser. It is further known to augment this process by employing a jet of gas to blow away the molten material to assure that it is removed from the cut before it resolidifies. The gas may include oxygen or other gases which react with the material to assist in the operation.

The apparatus for lasser cutting with gas assist generally comprises a laser, a housing containing a reservoir coupled to a source of pressurized gas, a nozzle having a round aperture for emitting the gas against the material being cut, and focusing optics in the housing to aim the laser beam through the nozzle aperture and onto the surface of the material. Typically the lasser beam is concentric with the nozzle aperture so that the gas impacts on the spot being heated by the laser. A variant of this is disclosed in the U.S. Pat. No. 4,871,897 to Nielsen which suggests displacing the laser beam from the nozzle center in the direction of cutting movement so that the gas impacts on material which has already been melted. The nozzle opening may have a circular, elliptical or other shape. To accomodate cutting along a curved path, the nozzle rotates to keep the laser beam and the nozzle center aligned in the direction of cutting.

The speed of the cutting operation is dependent on the laser power but is limited by the interaction time (of the laser energy and the gas with the workpiece) required to melt through the material thickness. Even if the lasser energy level and the gas flow are increased, there is a minimum time required to cut through the workpiece due to the time phased cutting cycle. This cycle includes heating the workpiece to the melting point using radiant and exothermic energy, and the blowing the melted material out the back side of the workpiece. As a result, circular concentric focus spots and nozzle openings must be moved slowly enough to expose the material to the gas and radiation for a minimum length of time. It is desirable to overcome the speed limitation to make the process more economical and thus widen its field of application.

SUMMARY OF THE INVENTION

It is therefore an object of the invention to provide a method and apparatus for high speed laser cutting. It is a further object to provide a cutting method and apparatus with an improved shape of laser energy pattern and gas flow pattern.

The invention is carried out by a method of laser cutting comprising the steps of: projecting onto a material surface an elongated pattern of radiant energy sufficient to melt the material, shaping a stream of gas to conform to the shape of the elongated pattern of radiant energy and directing the stream of gas onto the material coincident with the pattern of radiant energy, and moving the laser beam and the stream of gas along the material in the direction of the pattern elongation.

The invention is further carried out by a high speed laser cutting apparatus for movement along a cutting path comprising: a housing, a slot-like nozzle opening in the housing, means for directing a laser beam through the housing and out through the nozzle opening, means in the housing for forming the laser beam in a thin elongated pattern aligned with the elongated nozzle opening, and means for supplying gas to the housing for flow through the elongated nozzle opening.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
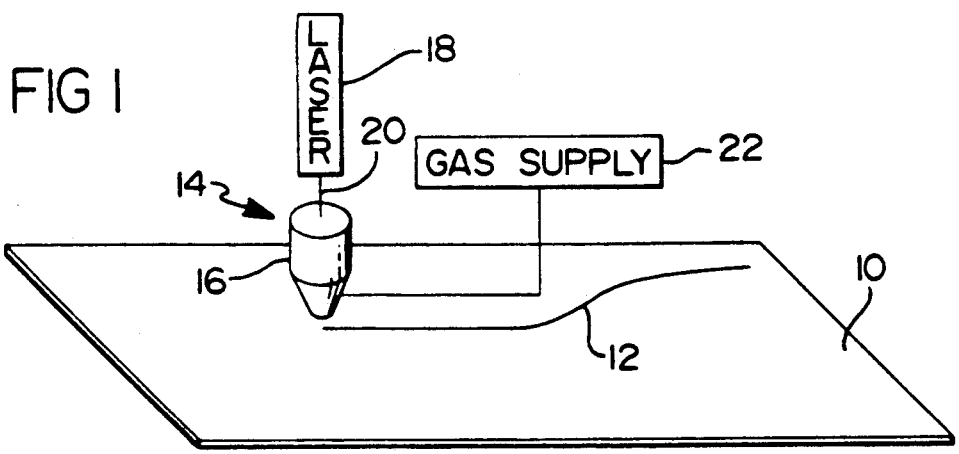
FIG. 1 is an isometric view of a laser cutting device and a workpiece to be cut.

Referring to FIG. 1, a workpiece 10 comprising a sheet of metal or other material is to be cut along a path 12. A laser cutting apparatus 14 which is conventional except for the nozzle and laser beam shape and positoning means, to be described, has a housing 16, a laser 18 which supplies a beam 20 of radiation to the housing along the housing center axis, and a gas supply 22 which couples a stream of gas to the housing 16.

Figure 2:
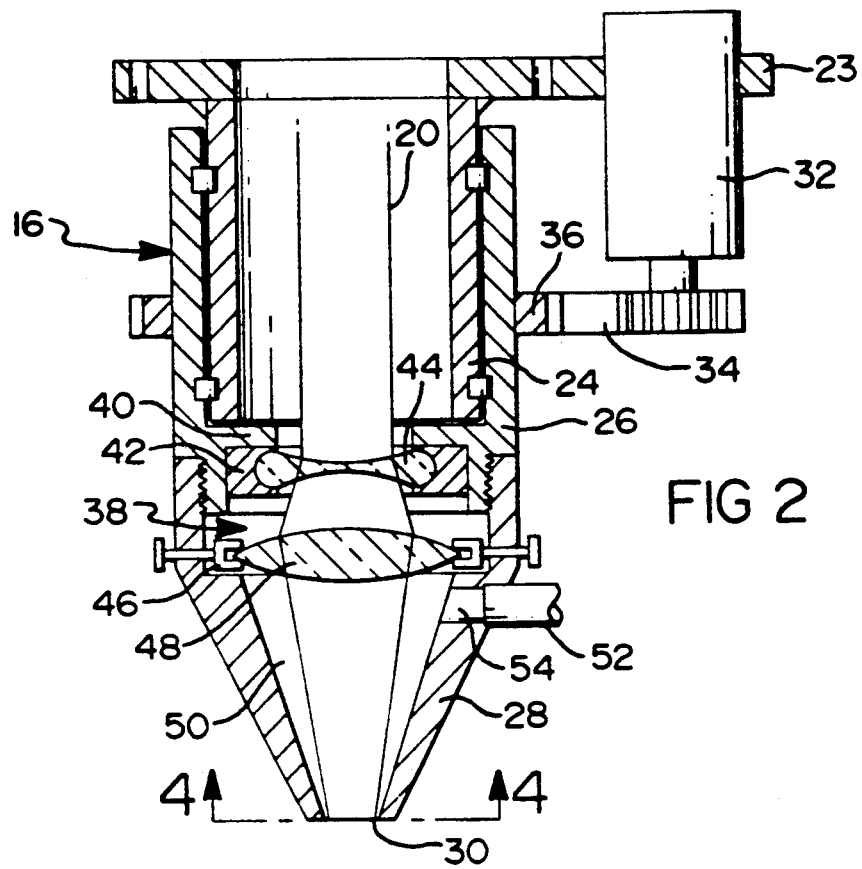
FIGS. 2 and 3 are cross-sectional front and side views respectively of a laser cutting apparatus according to the invention.
Figure 3:
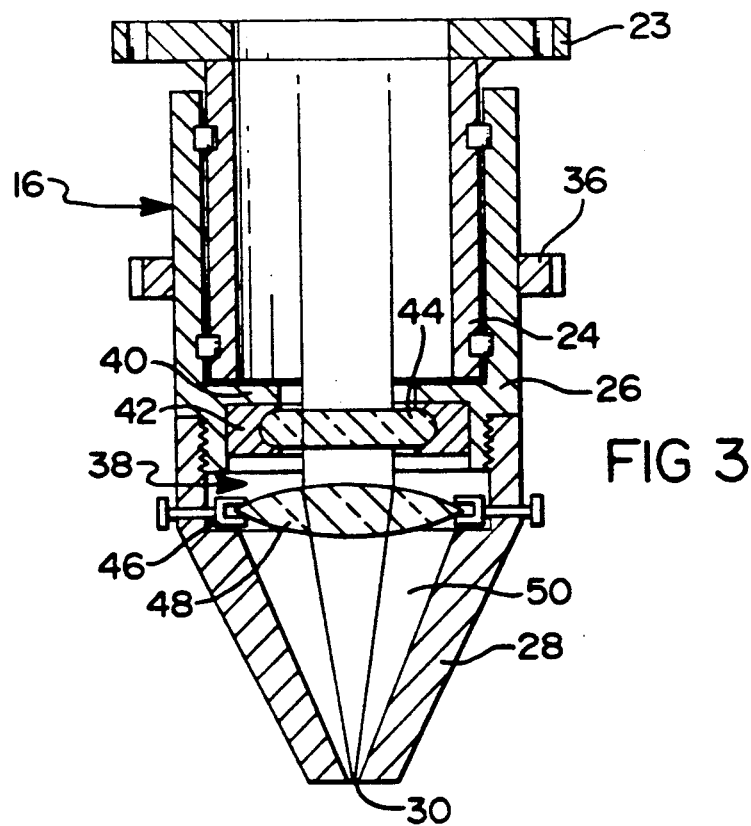

The housing 16 is shown in detail in FIGS. 2 and 3. An upper support 23 has a downwardly extending tubular section 24 which is rotatably journaled to an outer tubular section 26. A downwardly and inwardly tapered nozzle 28 depends from the lower end of the tubular section 26 and is fixed thereto for rotation therewith. An elongated or slot-like nozzle openning 30 is defined in the narrow end of the nozzle 28. The orientation of the nozzle opening 30 depends on the rotary position of the tubular section 26 which may be positioned by hand. Alternatively, the rotary position of section 26 is controlled by a motor 32 mounted on the support 23 and drivingly coupled to the section 26 by a belt 34 and pulley 36 drive arrangement.

Focusing optics 38 are supported in the housing 16 for rotation with outer tubular section 26. A radially inwardly directed flange 40 on the lower end of the outer section 26 holds a lens mount 42 which supports a diverging cylincrical lens 44 centrally in the housing 16 and aligned on the axis of the laser beam 20. The cylinder axis of the lens 44 is perpendicular to the nozzle opening 30 to effect beam spreading in the direction of elongation of the opening 30. Below the lens 44, the nozzle 28 contains a screw adjustable lens mount 46 which supports a spherical coverging lens 48 which is also centrally positioned in the housing and aligned with the laser beam 20. The lens mount 42 and the lens 44 along with the nozzle 28 form a plenum 50 containing gas which is provided under pressure from the gas supply 22 through a tube 52 and inlet aperture 54 in the side of the nozzle 28. The plenum 50 supplies a stream of gas flowing through the nozzle opening 30.

Figure 4:
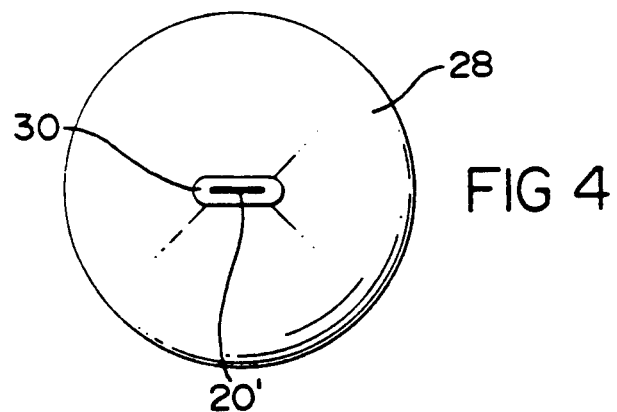
FIG. 4 is a view of a nozzle opening taken along line 4—4 of FIG. 2 with a laser beam pattern within the opening.

The laser beam 20, which initially has a circular cross section, is spread in one direction by the cylindrical lens 44 to extend the beam substantially across the elongated nozzle opening 30. The beam 20 is then focussed by the spherical lens 48 to a fine line which is centrally aligned with the nozzle opening 30. In practice, a single spherocylinder lens or other optic may be substituted for the two lens 44, 48 to transform the laser beam to a line. FIG. 4 shows the nozzle 28, the elongated opening 30, and the elongated line pattern 20' of the focused beam 20. The width of the nozzle opening 30 is typically 1 to 2 mm and the length is perhaps 5 mm but varies as a matter of design according to the length of the line pattern 20'.

Figure 5:
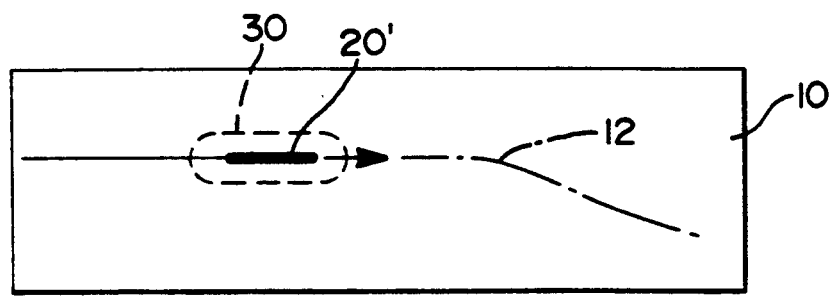
FIG. 5 is a plan view of a workpiece illustrating the laser interaction zone on the cutting path.

The length of the laser pattern 20' is dependent on the application. The material to be cut, the laser power, and the cutting speed all enter into the determination of the optimum line length of the pattern. When cutting a 0.030 inch thick steel sheet, conventional laser cutting employs a laser beam focused on the steel surface in a round spot having the smallest possible diameter which is typically 0.2 mm. Using a 300 watt laser and a high speed gas stream flowing through the nozzle, a cutting speed of 5 m/min is possible. Higher energy density does not appreciably improve the cutting speed because of the interaction time required to melt through the sheet and to remove the molten material. Referring to FIG. 5, it can be seen that by making the spot elongated in the direction of cutting (shown by the arrow) and maintaining the same energy density and the same gas velocity, the cutting speed can be increased while maintaining the same interaction time. (Of course, because of the increased area of the elongated nozzle opening, the gas pressure to the nozzle plenum 50 must be increased in order to maintain the same gas velocity, and the design of the optics 38 must take this pressure increase into account.) At a given moment, a path segment on the cutting path equal to the pattern length is exposed to the radiation energy. A moment later, the pattern will have advanced such that another path segment, overlapping the first path segment, is exposed to the radiation. Thus progressive melting and material removal at a given point can proceed into the same manner with a fast moving elongated pattern as with a slow moving round spot. For example, using a beam pattern 20' which is twice as long as the width, i.e. 0.4 mm long and 0.2 mm wide with a 600 watt laser, the cutting speed can be doubled to 10 m/min and the interaction time at a given point on the cutting path will remain the same to effect a complete cut. By the same token, a beam pattern 2 mm long using a 3 KW laser can achieve a cutting speed of 50 m/min. It will thus be seen that economically, the process is greatly enhanced by using the elongated laser pattern. The length of the pattern is not limited to 2 mm since even greater laser power is routinely available for industrial use, and the workpiece material and thickness also effects the practical limits. Because of the light cutting speeds attainable, the limiting factors may be the ability to manipulate the cutting device and accurately move it along the path.

The support 23 is attached to a robot arm or other programmable translating mechanism, not shown, for movement along the cutting path at the desired speed. When the path curves, the nozzle must be oriented with the elongated opening 30 tangent to the curve. Thus the motor 32 should be operated by the same controller which positions the translating mechanism to coordinate the nozzle orientation with the path position.

It will thus be seen that the method and apparatus described herein provide improved cutting speed for greater productivity.

The embodiment of the invention in which an exclusive property or privilege is claimed are defined as follows:

1. A method of laser cutting comprising the steps of:
   projecting onto a material surface an elongated pattern of radiant energy sufficient to melt the material,
   shaping a stream of gas to conform to the shape of the elongated pattern of radiant energy and directing the stream of gas onto the material coincident with the pattern of radiant energy, and
   moving the laser beam and the stream of gas along the material in the direction of the pattern elongation.

2. A method of laser cutting a workpiece along a prescribed path comprising the steps of:
   heating an elongated path segment of the workpiece by exposing the segment to a narrow elongated pattern of laser radiation sufficient to melt the segment,
   directing a stream of gas onto the path segment, and
   continuously advancing the pattern of radiation and the stream of gas along the path to progressively melt and remove material from the path.

3. The invention as defined in claim 2 wherein the step of moving in the direction of the pattern elongation comprises moving in a curved path with the direction of elongation tangent to the curved path.

4. A high speed laser cutting apparatus for movement along a cutting path comprising;
   a housing,
   a slot-like nozzle opening in the housing,
   means for directing a laser beam through the housing and out through the nozzle opening,
   means in the housing for forming the laser beam in a thin elongated pattern aligned with the elongated nozzle opening, and
   means for supplying gas to the housing for flow through the elongated nozzle opening.

5. The invention as defined in claim 4 wherein the means for shaping the laser beam comprises optical means for focusing the beam to a narrow width and to a length several times greater than the width.

6. The invention as defined in claim 4 wherein the means for shaping the laser beam comprises converging lens means for focusing the mean to a minimum width and cylindrical lens means for spreading the focused beam in the direction of elongation.

7. The invention as defined in claim 4 including means for positioning the nozzle opening with the direction of elongation aligned with the cutting path.

8. The invention as defined in claim 4 including means for rotating the nozzle for maintaining the direction of elongation of the nozzle opening aligned with the direction of the cutting path.

* * * * *